United States Patent
Driesen et al.

(10) Patent No.: US 10,684,868 B2
(45) Date of Patent: Jun. 16, 2020

(54) CONFIGURATION FOR APPLICATION USING MICROSERVICES

(71) Applicant: SAP SE, Walldorf (DE)

(72) Inventors: Volker Driesen, Heidelberg (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/874,627

(22) Filed: Jan. 18, 2018

(65) Prior Publication Data

US 2019/0220289 A1 Jul. 18, 2019

(51) Int. Cl.
*G06F 9/445* (2018.01)
*G06F 8/60* (2018.01)
*G06F 8/36* (2018.01)

(52) U.S. Cl.
CPC ............ *G06F 9/44505* (2013.01); *G06F 8/36* (2013.01); *G06F 8/60* (2013.01)

(58) Field of Classification Search
CPC ........... G06F 8/60; G06F 9/44505; G06F 8/36
USPC ....................................................... 717/177
See application file for complete search history.

(56) References Cited

U.S. PATENT DOCUMENTS

| | | | |
|---|---|---|---|
| 8,843,939 B2 * | 9/2014 | Lesandro et al. ...... | G06Q 10/06 717/177 |
| 2006/0248448 A1 * | 11/2006 | Williams et al. ... | G06F 9/44505 715/513 |
| 2018/0121221 A1 * | 5/2018 | Ahuja et al. .............. | G06F 8/60 |

\* cited by examiner

*Primary Examiner* — Wei Y Zhen
*Assistant Examiner* — Mohammed N Huda
(74) *Attorney, Agent, or Firm* — Schwegman Lundberg & Woessner, P.A.

(57) ABSTRACT

Various examples are directed to systems and methods for configuring an application that uses a plurality of microservices. A distributed configuration deploy service (DCDS) may generate a first set of microservice configuration parameter values for a first microservice of the plurality of microservices based at least in part on a first microservice configuration model for the first microservice and at least in part on a second configuration model for a second microservice of the plurality of microservices. A configuration application programming interface (API) may determine that the first set of microservice configuration parameter values do not conflict with first live data at the first microservice. The configuration API may also lock the first microservice; apply the first set of microservice configuration parameter values to the first microservice; and release the locking of the first microservice.

20 Claims, 11 Drawing Sheets

CONFIGURATION FOR APPLICATION USING MICROSERVICES

TECHNICAL FIELD

This document generally relates to methods and systems for use with computer devices, including networked computing devices. More particularly, this document relates to systems and methods for configuring an application implemented with microservices.

BACKGROUND

An application may be built to utilize a set of independent microservices. The microservices may be executed at a common computing device or distributed across multiple computing devices. When an application is built with microservices, the microservices may be individually updated, sometimes without the need to modify the application as a whole for each change.

BRIEF DESCRIPTION OF DRAWINGS

The present disclosure is illustrated by way of example and not limitation in the following figures.

DETAILED DESCRIPTION

Figure 1:
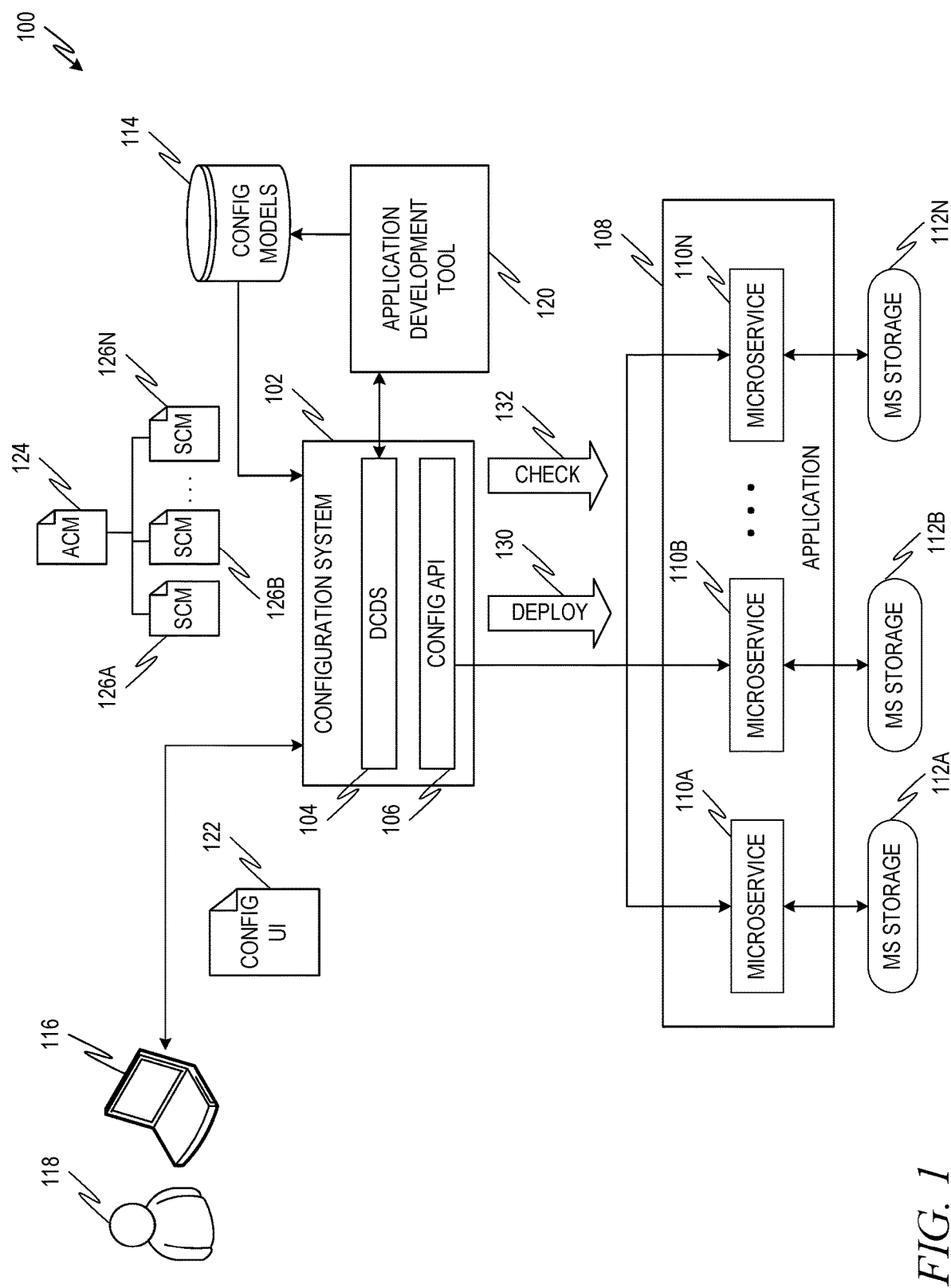
FIG. 1 is a diagram showing one example of an environment for configuring an application that uses microservices.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for configuring applications in a microservice architecture including at least one microservice-built application. A microservice is a self-contained unit of software that persists working data at an independent storage location specific to the microservice. For example, a microservice persists its working data at a storage location that may not accessible to other microservices. This can be accomplished in different ways. In some examples, a microservice is executed by a dedicated virtual machine executing at a server or other computing device. Working data for the microservice may be stored at a virtual disk of the virtual machine. In some examples, a microservice executes at a server or other computing device. The microservice may be assigned a dedicated drive, partition or other suitable storage area at the computing device.

A microservice-built application includes a set of two or more microservices. Different functional units of the application are implemented with different microservices. This arrangement provides certain advantages, such as, simpler upgrades and increased robustness. For example, an application built with microservices may be updated on a microservice-by-microservice basis. Changes are made to one or more targeted microservices, often without the need to modify other microservices. Also, because microservices are self-contained, failure of one or even a set of microservices may not cause the application to crash. Instead, failed microservices are sometimes restarted while the application executes.

Although microservice-based applications provide advantages, they also present challenges. For example, configuring a microservice-based application includes configuring multiple, independent microservices. Often, there are dependencies between the configurations of the different services. For example, setting or changing a configuration parameter for one microservice may require setting or changing one or more other configuration parameter values in one or more other microservices. Also, for example, selecting a particular configuration parameter for one microservice may limit the range of acceptable configuration parameter values for one or more other microservices. Additional challenges relate to the configuration process. For example, if one configuration parameter change is made to a first microservice, but a corresponding configuration parameter change to a second microservice fails, the application may become inconsistent.

These and other issues may be addressed with a configuration system, as described herein. The configuration system includes a distributed configuration deployment service (DCDS) and one or more configuration application program interfaces. The DCDS accesses one or more service command models. A service command model describes a microservice, including one or more configuration parameter values for the microservice. The DCDS synthesizes the service command models to generate application configuration parameter values and/or application configuration constraints. The application configuration constraints reflect the allowable configuration parameter values for the various microservices in view of the constraints of other microservices.

The DCDS receives configuration parameter values for the application. Using the application configuration constraints, the DCDS derives sets of microservice parameters for the different microservices. For example, a first set of microservice parameters is determined for a first microservice and a second set of microservice parameters is determined for a second set of microservices. The sets of microservice parameters are deployed to the microservices to implement application configuration.

FIG. 1 is a diagram showing one example of an environment 100 for configuring an application that uses microservices. The environment 100 includes a configuration system 102 and an application 108 built with microservices 110A, 110B, 110N. Although three microservices 110A, 110B, 110N are shown in FIG. 1, any suitable number of microservices may be used.

The configuration system 102 may be any suitable computing device or set of computing devices including a processor or processor unit, as described herein. The application 108 and/or the microservices 110A, 110B, 110N implementing the application 108 may also be executed at a computing device including a processor or processor unit, as described herein. The application 108 and/or microservices 110A, 110B, 110N may be executed at the same computing device or may be distributed to execute at a set of different computing devices. In some examples, the application 108 and/or some or all of the microservices 110A, 110B, 110N execute at the configuration system 102.

Microservices 110A, 110B, 110N are in communication with respective storage locations 112A, 112B, 112N. The microservices 110A, 110B, 110N persist working data at the respective storage locations 112A, 112B, 112N. The storage locations 112A, 112B, 112N may be, for example, virtual disks of respective virtual machines executing the respective microservices 110A, 110B, 110N. For example, storage location 112A may be a virtual disk of a virtual machine that executes the microservice 110A. In some examples, storage locations 112A, 112B, 112N may be or include respective dedicated drives, partitions, or other subdivisions of data storage. For example, storage location 112A may be or include a dedicated drive, partition, or other subdivision of data storage dedicated to the microservice 110A.

The configuration system 102 executes a DCDS 104 and may also execute a configuration API 106. The DCDS 104 generates sets of configuration parameter values for the respective microservices 110A, 110B, 110N. For example, the DCDS 104 generates a first set of configuration parameter values for the microservice 110A, a second set of configuration parameter values for the microservice 110B, and so on.

The DCDS 104 generates sets of microservice configuration parameter values, in some examples, considering an application configuration model 124 and/or one or more service configuration models 126A, 126B, 126N. The application configuration model 124 may describe the application 108. The service configuration models 126A, 126B, 126N may describe the microservices 110A, 110B, 110N. For example, service configuration model 126A may describe microservice 110A; service configuration model 126B may describe microservice 110B; and so on.

Service configuration models 126A, 126B, 126N describe configuration parameter values for the respective microservices 110A, 110B, 110N. For example, a service configuration model 126A may describe configuration parameter values, such as switches and other parameter values that the microservice 110A receives as input. The service configuration model 126A may also describe arrays, tables, or other data objects that may be used to provide configuration parameter values to the microservice 110A. The service configuration model 126A may also describe constraints on microservice configuration parameter values for the microservice 110A (microservice configuration constraints).

Microservice configuration constraints may include, for example, variable types, a set or range of values that are permissible for configuration parameters to the microservice 110A, etc. Microservice configuration constraints may also describe a set of configuration parameter values. For example, a constraint on configuration parameter values to the microservice 110A may indicate that a particular value or range of values for a first microservice configuration parameter limits the allowable values for a second microservice configuration parameter. For example, a configuration parameter describing a shipping carrier for a particular transaction may be limited by another configuration parameter describing a country for the transaction. That is, a transaction in a particular country may be limited to only use shipping carriers that operate in the particular country. The service configuration models 126B, 126N may be arranged in a similar manner relative to respective microservices 110B, 110N, etc.

The application configuration model 124 describes the application 108. In some examples, the application configuration model 124 is an extension of a service configuration model 126A, 126B, 126N. For example, the application configuration model 124 may have a structure and features similar to that of the service configuration models 126A, 126B, 126N with additional features and/or attributes. The application configuration model 124 may describe a set of microservices 110A, 110B, 110N used by the application 108. For example, the application configuration model 124 may include an indication of the microservices 110A, 110B, 110N used by the application 108. The application configuration model 124, in some examples, includes an indication of the service configuration models 126A, 126B, 126N associated with the microservices 110A, 110B, 110N.

The application configuration model 124 also describes application configuration parameter values for the application. For example, the application configuration model may map application configuration parameter values to corresponding microservice configuration parameters for the various microservices 110A, 110B, 110N. The application configuration model 124, in some examples, also indicates one or more microservice configuration parameter values from the various microservices 110A, 110B, 110N that may be directly exposed as application configuration parameter values. A microservice configuration parameter that is directly exposed as an application configuration parameter is a microservice configuration parameter that has a one-to-one correlation to the corresponding application configuration parameter.

This application configuration model 124, in some examples, also describes one or more application configuration constraints. Application configuration constraints are constraints on the value or values that may be taken by particular application configuration parameter and/or corresponding microservice configuration parameter. For example, a constraint on application configuration parameter values may indicate that a particular value or range of values for a first application configuration parameter limits the allowable value or values for a second application configuration parameter. In some examples, the application configuration model 124 includes content, such as predetermined values for one or more application configuration parameter values and/or microservice configuration parameter values.

In some examples, the application configuration model 124 and service configuration models 126A, 126B, 126N are stored at a configuration model data store 114 including one or more data storage devices that are accessible to the DCDS 104. The DCDS 104 may load one or more of the application configuration model 124 and the service configuration models 126A, 126B, 126N. In some examples, the DCDS 104 derives some or all of the application configuration model 124 based on the service configuration models 126A, 126B, 126N. Also, in some examples, the application configuration model 124 may be omitted and the DCDS 104 may derive sets of configuration parameter values for the microservices 110A, 110B, 110N directly from the service configuration models 126A, 126B, 126N.

The DCDS 104, in some examples, also generates and provides a configuration UI 122 to a user computing device 116 utilized by a user 118. The configuration UI 122 includes fields for receiving application configuration parameter values. For example, application configuration parameter values may be derived from the application configuration model 124 and/or service configuration models 126A, 126B, 126N as described herein. The DCDS 104 may also enforce application configuration constraints at the configuration UI 122. For example, the user 118 may be prevented from entering values for application configuration parameter values that are impermissible in general or in view of other values for application configuration parameter values entered at the configuration UI 122. In some examples, the DCDS 104 utilizes a check configuration request 132 to one or more of the microservices 110A, 110B, 110N to verify application configuration parameter values entered at the configuration UI against working data in use by the various microservices 110A, 110B, 110N, as described herein.

To further illustrate, consider an example in which the application 108 processes order fulfillment for electronic commerce. In this example, a first microservice 110A manages tax consequences of the various orders, and a second microservice 110B manages shipping services for providing ordered goods to a customer. The first microservice 110A receives microservice configuration parameter values as described by TABLE 1 and the second microservice 110B receives microservice configuration parameter values described by TABLE 2:

TABLE 1

Tax Microservice

| | |
|---|---|
| 1 | Country A Switch |
| 2 | Country A Tax Service(s) |
| 3 | Country B Switch |
| 4 | Country B Tax Service(s) |
| 5 | Country C Switch |
| 6 | Country C Tax Service(s) |

TABLE 2

Shipping Microservice

| | |
|---|---|
| 7 | Country A Switch |
| 8 | Country A Shipping Service(s) |
| 9 | Country B Switch |
| 10 | Country B Shipping Service(s) |
| 11 | Country C Switch |
| 12 | Country C Shipping Service(s) |

To clarify the example, the microservice configuration parameter values for the tax microservice 110A are labeled 1-6. The microservice configuration parameters for the shipping microservice 110B are labeled 7-12. In this example, microservice configuration parameter values 1, 3, 5, from the tax microservice and microservice configuration parameter values 7, 9, and 11 from the shipping microservice are switch parameters that indicate whether the respective microservices are configured for the indicated country. For example, a service configuration model 126A for the tax microservice 110A may include a constraint indicating that if parameter 1 is true, indicating that the microservice 110A is configured for Country A, then a set of microservice configuration parameter values provided to the microservice 110A should also include at least one value for parameter 2 indicating a tax service for Country A.

The considered example and the TABLES 1 and 2 also illustrate a potential application configuration constraint. For example, the application 108 may be inconsistently configured if the user 118 provides inconsistent values for the country switches (for example, if parameter 1 is true and parameter 7 is false). Therefore, the DCDS 104 may implement an application configuration constraint that if a particular country switch is enabled in one microservice, then it should also be enabled in the other microservice.

Figure 2:
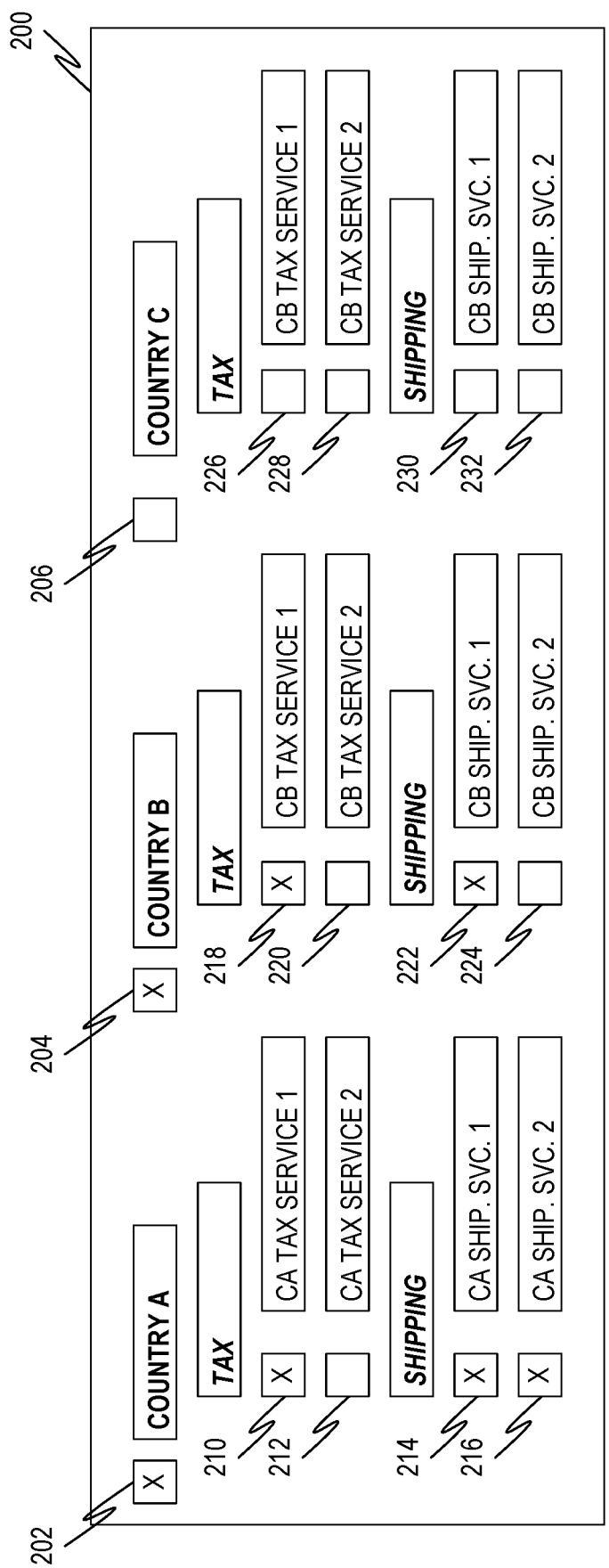
FIG. 2 shows an example screen that may be a part of the configuration user interface (UI) in the considered example.

FIG. 2 shows an example screen 200 that may be a part of the configuration UI 122 in the considered example. The screen 200 may be displayed at the user computing device 116 to receive data from the user 118. The screen 200 includes fields for Country A (field 202), Country B (field 204), and Country C (field 206). In this example, the microservice configuration parameter "country" is a shared parameter. Instead of providing separate country switch parameter values for each microservice, the user 118 may provide a single country switch value for the respective countries. For example, the DCDS may map the value for Country A provided at field 202 to both parameter 1 and parameter 7 from TABLES 1 and 2 above.

The screen 200 also shows tax service fields 210, 212, 218, 220, 226, 228. The DCDS 104 may map values received at these fields 210, 212, 218, 220, 226, 228 to respective tax service parameters 2, 4, and 6 from TABLE 1 and microservice 110A. Similarly, the DCDS 104 may map shipping service fields 214, 216, 222, 224, 230, 232 to shipping service parameters 8, 10, and 12 from TABLE 2 and microservice 110B. The DCDS may also enforce application and/or microservice configuration constraints with the screen 200. For example, if the user 118 sets a particular country field to true, the DCDS 104 may decline to deploy the resulting sets of microservice configuration parameter values until or unless values for tax and shipping service values are also received or determined.

This example illustrates a potential conflict that could be addressed by the DCDS 104. For example, if the DCDS 104 receives a microservice configuration parameter indicating one or more shipping services for country A, but fails to receive a corresponding microservice configuration parameter indicating a tax service or services for that country, the DCDS 104 may decline to deploy the sets of microservice configuration parameter values. In some examples, the screen 200 also demonstrates content for the application 108 that may be indicated by the application configuration model 124. For example, the application configuration model 124 may describe default and/or predetermined values for one or more configuration parameter values. Default or predetermined values for one or more configuration parameter values may be reflected at the appropriate field or fields of the screen 200. For example, when the screen 200 is displayed, one or more fields may be pre-populated with the default or predetermined values. The user 118 may be permitted to modify default values or may not be permitted to modify predetermined values.

Although in the above example the microservices 110A, 110B were described as handling tax and shipping tasks, respectively, this example is for purposes of illustration. Microservices 110A, 110B, 110N may be configured to perform other and different functions in different implementations.

Referring back to FIG. 1, the DCDS 104 may be programmed to test and/or deploy sets of microservice configuration parameter values using one or more configuration APIs 106. The configuration API 106 is configured to provide the sets of microservice configuration parameter values to the microservices 110A, 110B, 110N and may be configured to receive and respond to configuration check requests 132 and deploy requests 130.

A check request 132 from the DCDS 104 to the configuration API 106 may include sets of microservice configuration parameter values for one or more of the microservices 110A, 110B, 110N. In response to a check request 132, the configuration API 106 compares the received sets of microservice configuration parameter values to live working data of the various microservices 110A, 110B, 110N (e.g., at microservice storage 112A, 112B, 112N). For example, the DCDS 104 may not change the active microservice configuration parameter values at a microservice 110A, 110B, 110N. That is, the microservices 110A, 110B, 110N may not operate on live working data under the sets of microservice configuration parameter values provided with a check request 132. The configuration API 106 may return to the DCDS 104 an indication of whether any of the sets of microservice configuration data conflicted with live working data at any of the respective microservices 110A, 110B, 110N.

A set of microservice configuration data conflicts with live working data if the set of microservice configuration data is inconsistent with the live working data. Consider an example in which an initial set of microservice configuration data includes a data unit of a particular type, and the microservice has already generated live data including objects that reference the data unit. If a new set of microservice configuration data replaces the previous data unit, then the new set of microservice configuration data may be inconsistent with the live data referencing the previous data unit. Consider another example in which the live data is part of an open workflow. A new set of microservice configuration data may be inconsistent with live data (e.g., until the open workflow is closed. Also, consider an example in which a data unit is removed from a set of microservice configuration data to form a revised set of microservice configuration data. The live data may be inconsistent the revised set of microservice configuration data if the removed data unit has already been used to generate and/or use the live data.

A deploy request 130 from the DCDS 104 to the configuration API 106 may also include a set of microservice configuration parameter values for one or more of the microservices 110A, 110B, 110N. In response to the deploy request 130, the configuration API 106 compares the received sets of microservice configuration parameter values to live working data of the various microservices 110A, 110B, 110N. If no conflicts are detected at a microservice 110A, then the microservice 110A is locked to prevent changes to microservice 110A. This is repeated at the other microservices 110B, 110N. If a conflict is detected at any microservices 110A, 110B, 110N, then the deploy request 130 fails and all microservices 110A, 110B, 110N are unlocked. (A failure message may be sent to the DCDS 104.) If no conflicts are detected at any of the microservices 110A, 110B, 110N, then the sets of microservice configuration parameter values are deployed and the microservices 110A, 110B, 110N are unlocked. Upon unlocking, the microservices 110A, 110B, 110N operate according to the sets of microservice configuration parameter values included with the deploy request 130.

In some examples, the DCDS 104 and/or the configuration model data store 114 are in communication with an application development tool 120. The application development tool 120 may generate an application configuration model 124 that references various service configuration models 126A, 126B, 126N as described. In some examples, the application development tool 120 may be utilized to determine data for the application configuration model 124 including, for example, content, including application configuration parameter values, etc. In some examples, the application development tool 120 may be or use the SAP Web IDE product from SAP SE of Walldorf, Germany.

Figure 3:
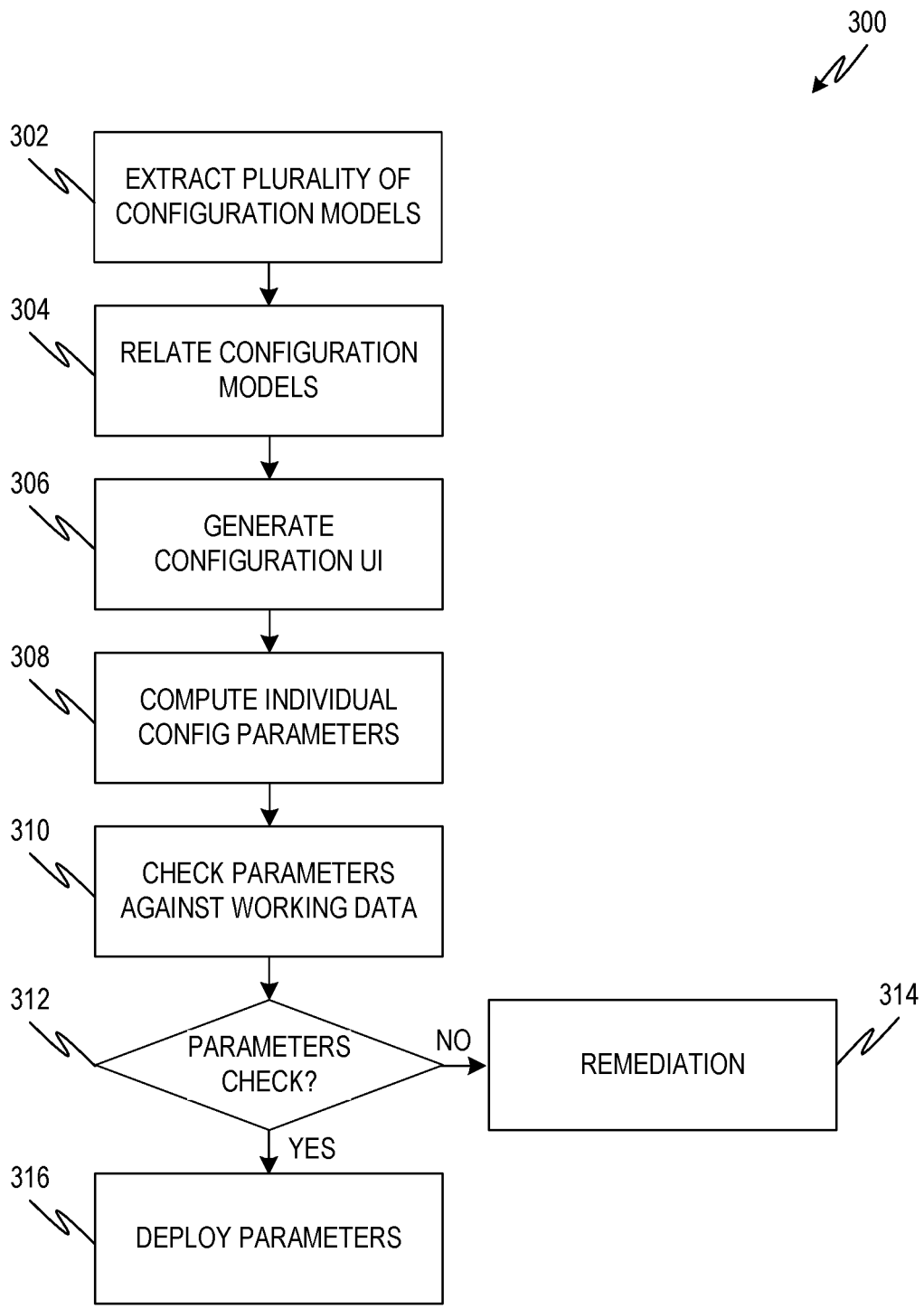
FIG. 3 is a flowchart showing one example of a process flow that may be executed by a distributed configuration deployment service (DCDS) to develop and deploy sets of microservice configuration parameter values to a set of microservices of a microservice-built application.

FIG. 3 is a flowchart showing one example of a process flow 300 that may be executed by a DCDS, such as the DCDS 104, to develop and deploy sets of microservice configuration parameter values to a set of microservices of a microservice-built application. At operation 302, the DCDS extracts a plurality of configuration models. The extracted configuration models may include a plurality of microservice configuration models corresponding to a plurality of microservices making up all or part of an application. In some examples, the DCDS also extracts an application configuration model.

At operation 304, the DCDS relates the configuration models. For example, the DCDS may synthesize the service configuration models to generate application configuration parameter values and/or application configuration constraints. In some examples, when an application configuration model is present, the application configuration model defines some or all of the application configuration parameter values, some or all of the application configuration constraints, and/or application content including values for one or more application configuration parameter values.

At operation 306, the DCDS generates a configuration UI. The configuration UI prompts a user to provide values for the application configuration parameter values. In some examples, the DCDS also enforces application configuration constraints on the application configuration parameter values received through the configuration UI. For example, if the user provides a value that is inconsistent with an application configuration constraint, then the DCDS may decline to proceed with the inconsistent value and/or prevent the user from entering the value into the configuration UI.

At operation 308, the DCDS generates individual sets of microservice configuration parameter values. In some examples, a set of microservice configuration parameter values is generated for each microservice used by the application. The sets of microservice configuration parameter values may be derived, for example, from application configuration parameter values received through the UI, from content provided with an application configuration model, etc.

At operation 310, the sets of microservice configuration parameter values generated at operation 308 are checked against live working data at the various microservices. If the sets of microservice parameter values check at operation 312, the sets of microservice configuration parameters are deployed at operation 316. If not, remedial actions may be taken at operation 314. Remedial actions may include prompting the user to provide new values of the application configuration parameters. In some examples, remedial actions include generating an additional temporary or permanent application configuration constraint to prevent a next set of application configuration values from failing the check. (In some examples, remediation is omitted.) If the sets of microservice configuration parameter values do check, they may be deployed at operation 316.

In some examples, the DCDS makes a deploy request at operation 310 and the configuration API or APIs may perform operations 312, 314, and/or 316. In other examples, the DCDS performs operations 310, 312, 314, and/or 316. For example, the DCDS may make a check request to a configuration API associated with the DCDS and/or the various microservices and decide whether to deploy the parameters or remediate. In some examples, the DCDS makes a deploy request at 316, which may result in the configuration API making an additional check of the sets of microservice configuration parameter values, as described herein.

Figure 4:
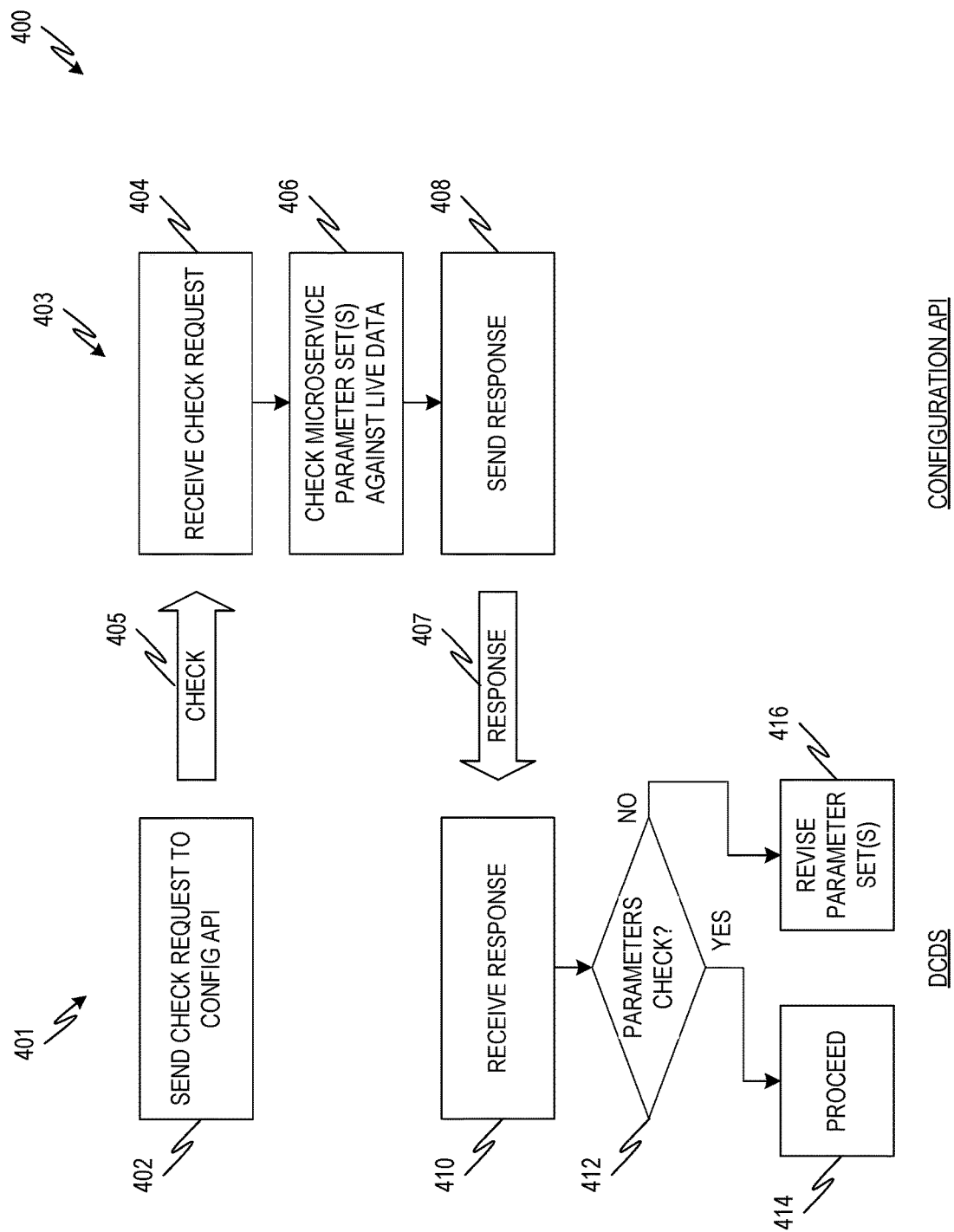
FIG. 4 is a flowchart showing one example of a process flow that may be executed by the DCDS and a configuration Application Programming Interface (API) to check one or more sets of microservice configuration parameter values using a check request.

FIG. 4 is a flowchart showing one example of a process flow 400 that may be executed by the DCDS and a configuration API to check one or more sets of microservice configuration parameter values using a check request. The process flow 400 includes two columns 401, 403. Column 401 includes operations that are executed by the DCDS. Column 403 includes operations that are executed by the configuration API.

At operation 402, the DCDS sends a check request 405 to a configuration API. The check request 405 may include one or more sets of microservice configuration values. The DCDS may send the check request 405 on any suitable occasion in its processing. For example, the DCDS may send the check request 405 while in the process of determining one or more sets of microservice configuration parameter values. If the check request 405 fails, the DCDS may determine or obtain alternate configuration parameter values before determining complete sets of microservice configuration values for deployment. In another example, the DCDS may make the check request 405 after determining sets of microservice configuration parameter values and before attempting to deploy the sets. Also, although FIG. 4 shows a single configuration API handling multiple microservices, in some examples, the DCDS may correspond with multiple configuration APIs that each manage one or more microservices.

At operation 404, the configuration API receives the check request. At operation 406, the configuration API checks the set's microservice configuration parameter values against live working data at the microservices, for example, as described herein. At operation 408, the configuration API sends a response message 407. The response message 407 indicates the results of the check at operation 406. For example, if the received set or sets of microservice configuration parameter values all check, the response message 407 may indicate so. If one or more sets of microservice configuration parameter values do not check, the response message 407 may indicate this and may also indicate a description of the reason for one or more check failures.

The DCDS receives the response message 407 at operation 410. At operation 412, the DCDS reads the response message 407 to determine whether the set or sets of microservice configuration parameters check. If not, the DCDS optionally revises the set or sets of microservice configuration parameter values at operation 416. If the set or sets of microservice configuration parameters do check, the DCDS may proceed at operation 414.

Figure 5:
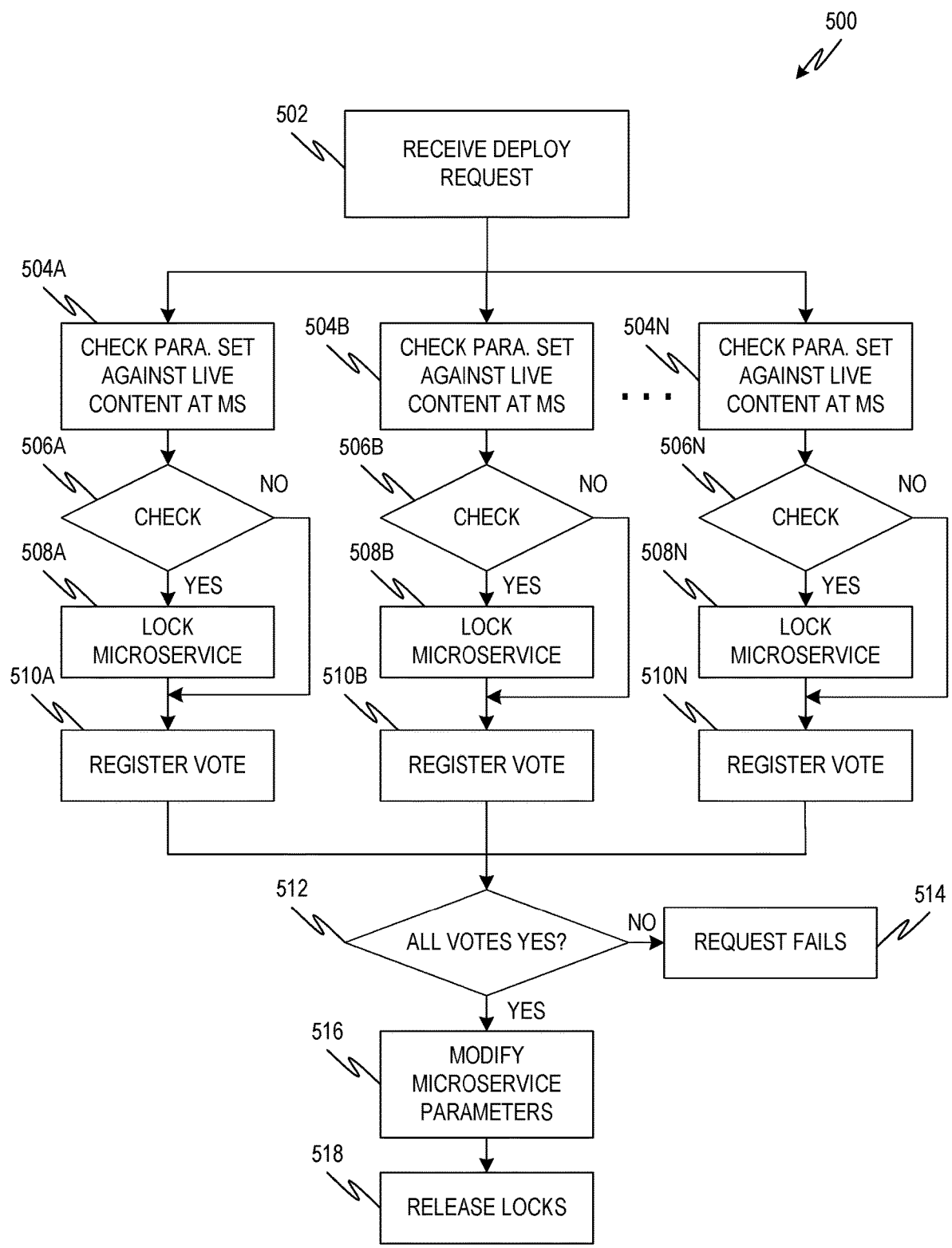
FIG. 5 is a flowchart showing one example of a process flow that may be executed by one or more configuration APIs to execute a deploy request.

FIG. 5 is a flowchart showing one example of a process flow 500 that may be executed by one or more configuration APIs to execute a deploy request. At operation 502, the configuration API receives the deploy request. At operations 504A, 504B, 504N, the configuration API checks sets of microservice configuration parameters against live working data at the respective microservices. For example, at operation 504A, the configuration API checks a first set of microservice configuration parameter values at a first microservice. At operation 504B, the configuration API checks a second set of microservice configuration parameter values at a second microservice, and so on.

At operations 506A, 506B, 506N, the configuration API determines if the sets of microservice configuration parameters checked at operations 504A, 504B, 504N conflict with live data. For example, at operation 506A, the configuration API determines if the first set of microservice configuration parameter values at the first microservice conflict with live data at the first microservice storage. At operation 506B, the configuration API determines if the second set of microservice configuration parameter values at the second microservice conflict with live data at the second microservice storage, and so on.

If the set of microservice configuration parameters for a microservice checks at operations 506A, 506B, 506N, the configuration API locks the corresponding microservice at operations 508A, 508B, 508N. For example, if the first set of microservice configuration parameters checks against live data at the first microservice storage, the configuration API locks the first microservice at operation 508A. If the second set of microservice configuration parameters checks against live data at the second microservice storage, the configuration API locks the second microservice, and so on. Locking a microservice includes preventing the microservice from receiving changes to its configuration parameters. In some examples, locking a microservice also includes preventing the microservice from taking further action with respect to the application 108.

At operations 510A, 510B, 510N, the configuration API registers a vote for the respective microservices. For example, if a set of configuration parameter values did not match live working data at a microservice, then the API registers a no vote. If the set of configuration parameter values does match the life working data at the microservice (and the microservice was locked at one of operations 508A, 508B, 508N), the configuration API may register a yes vote. For example, the configuration API may register a vote for the first microservice at operation 510A, register a vote for the second microservice at operation 510B, and so on.

At operation 512, the configuration API may determine whether all of the votes from the respective microservices are yes. If not, the deploy request may fail at operation 514. For example, the configuration API may optionally release any locks at the microservices that may have been implemented at operations 508A, 508B, 508N. If all of the votes at operation 512 are yes, then at operation 516, the configuration API may modify the configuration parameter values of the microservices, for example, by writing the respective sets of microservice configuration parameter sets to the respective microservices. For example, the first set of microservice configuration parameter values is written to the first microservice; the second set of microservice configuration parameter values is written to the second microservice, and so on. At operation 518, the configuration API releases the locks that were implemented at operations 508A, 508B, 508N.

Although the process flow 500 is described as being performed by a single configuration API, in some examples, some or all of the functions of the process flow 500 are performed locally at the respective microservices. In some examples, each microservice includes a configuration API that is in communication with the DCDS. Also, in some examples, a configuration API portion at the configuration system 102 is in communication with a plurality of configuration APIs at the respective microservices.

Figure 6:
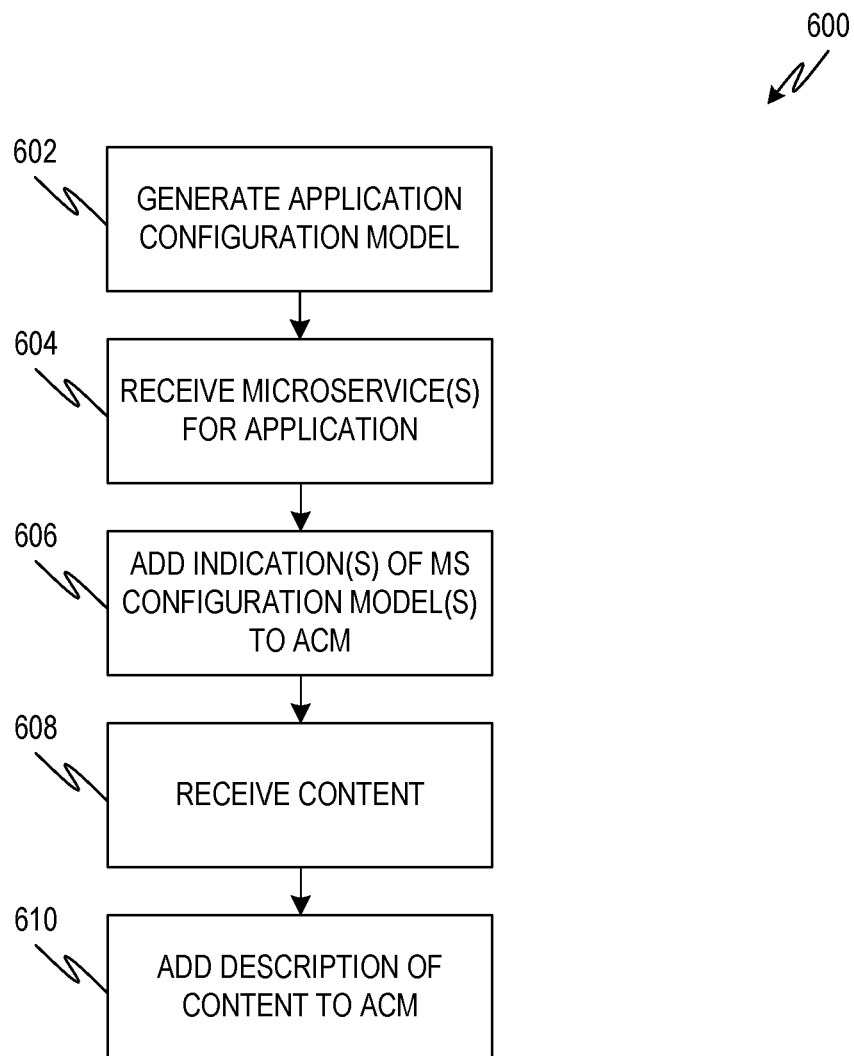
FIG. 6 is flowchart showing one example of a process flow that may be executed by an application development tool.

FIG. 6 is flowchart showing one example of a process flow 600 that may be executed by an application development tool, such as the application development tool 120 of FIG. 1. For example, a user, such as the user 118, may use the application development tool to develop a microservice-built application. At operation 602, the application development tool generates an application configuration model. At operation 604, the application development tool receives, from the user, an indication of the microservices that will be used by the application.

At operation 606, the application development tool adds to the application configuration model an indication of the microservices that will be used by the application. At operation 608, the application development tool may receive content for the application. Content may include, for example, predetermined values for one or more application configuration parameter values and/or microservice configuration parameter values. At operation 610, the application development tool adds the content to the application configuration model. The application configuration model may be used to modify configuration parameters for one or more of the microservices, for example, as described herein.

Figure 7:
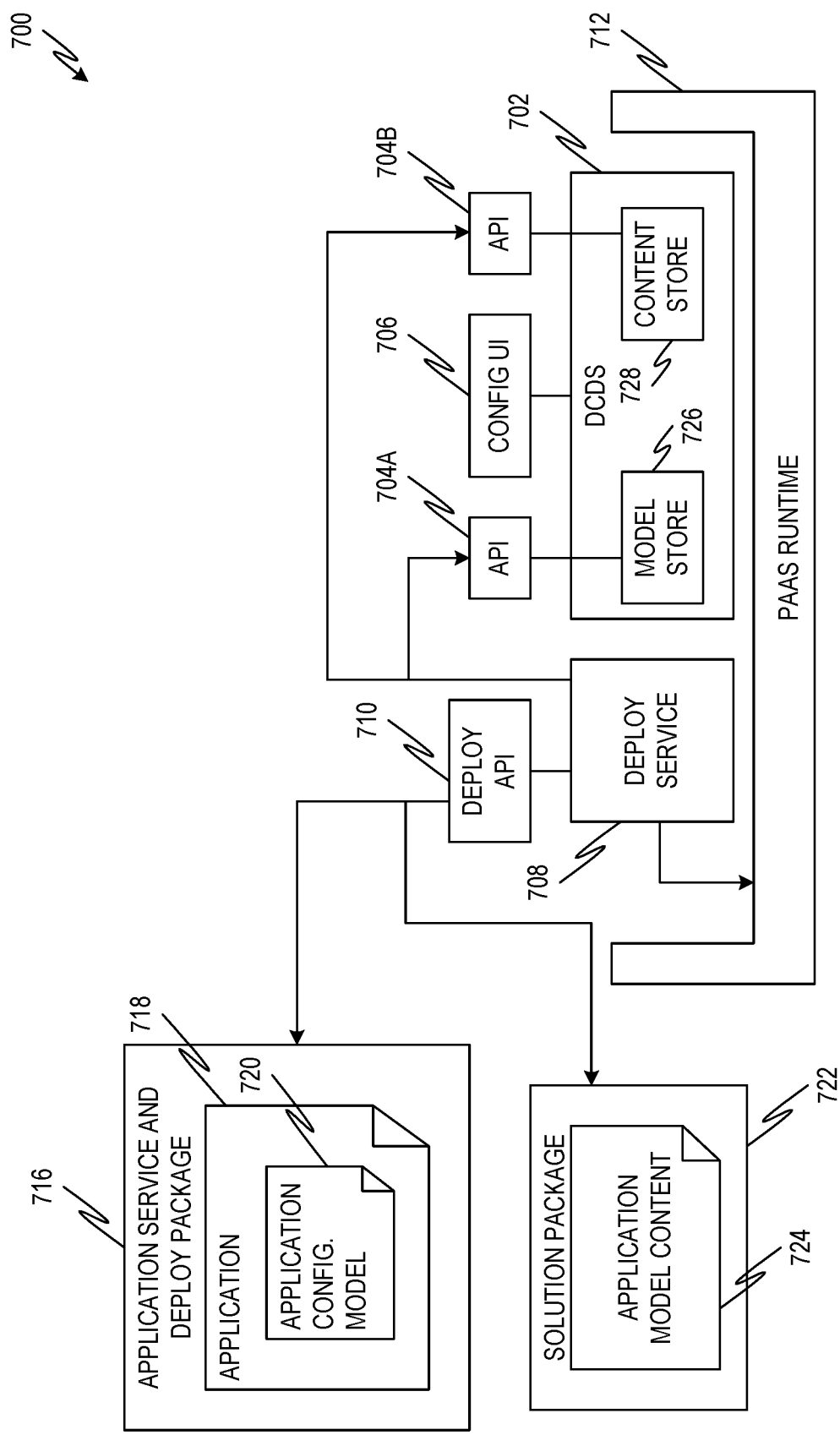
FIG. 7 is a diagram showing another example environment for configuring an application that uses microservices.

FIG. 7 is a diagram showing another example environment 700 for configuring an application that uses microservices. The environment 700 includes a DCDS 702, which may be similar to the DCDS 104 and/or other DCDS configurations described herein. An application service and deploy package (ASDP) 716 includes a microservice-built application 718 and an application configuration model 720. Upon deployment of the ASDP 716, the ASDP 716 may read the application configuration model 720 and deploy the DCDS 702.

The DCDS 702 includes a model store 726 for storing application configuration models, such as 720, as well as service configuration models, such as, for example, service configuration models referenced by the application configuration model 720. The DCDS 702 also includes a content store 728 that may store and/or reference content included in or indicated by the application configuration model 720. The DCDS 702 may provide a configuration UI 706, as described herein, to receive application configuration parameters. The application configuration parameters may be utilized, in conjunction with the application configuration model, service configuration models, and/or content to generate sets of microservice configuration parameter values. The sets of configuration parameter values may be provided to a deploy service 708 via APIs 704A, 704B. The deploy service 708 may provide sets of microservice configuration parameter values to the application 718 via a deploy API 710. The deploy service 708 and/or deploy API 710 may perform functions similar to those of the configuration API 106 described herein. The deploy service 708 and DCDS 702 may be executed on a cloud platform, for example, including a platform-as-a-service (PAAS) runtime 712. The PAAS runtime 712 may connect the DCDS 702 and deploy service 708 to underlying hardware in a cloud environment. In some examples, the PAAS runtime 712 is or includes a Cloud Foundry runtime, for example, available from the Cloud Foundry Foundation. In some examples, instead of or in addition to being stored at the application configuration model 720, application model content 724 may be stored at a solution package 722. The solution package 722 may include, for example, an application identification that references the application 718. The DCDS may import content from the application model content 724 and use the content to configure the application 718, as described herein. In some examples, the application model content 724 of the solution package 722 may be set by an administrator, or other key user, to define some or all of the application configuration parameter values for a particular implementation. For example, multiple solution packages, such as 722, may be available for loading to the DCDS 702 at runtime.

Figure 8:
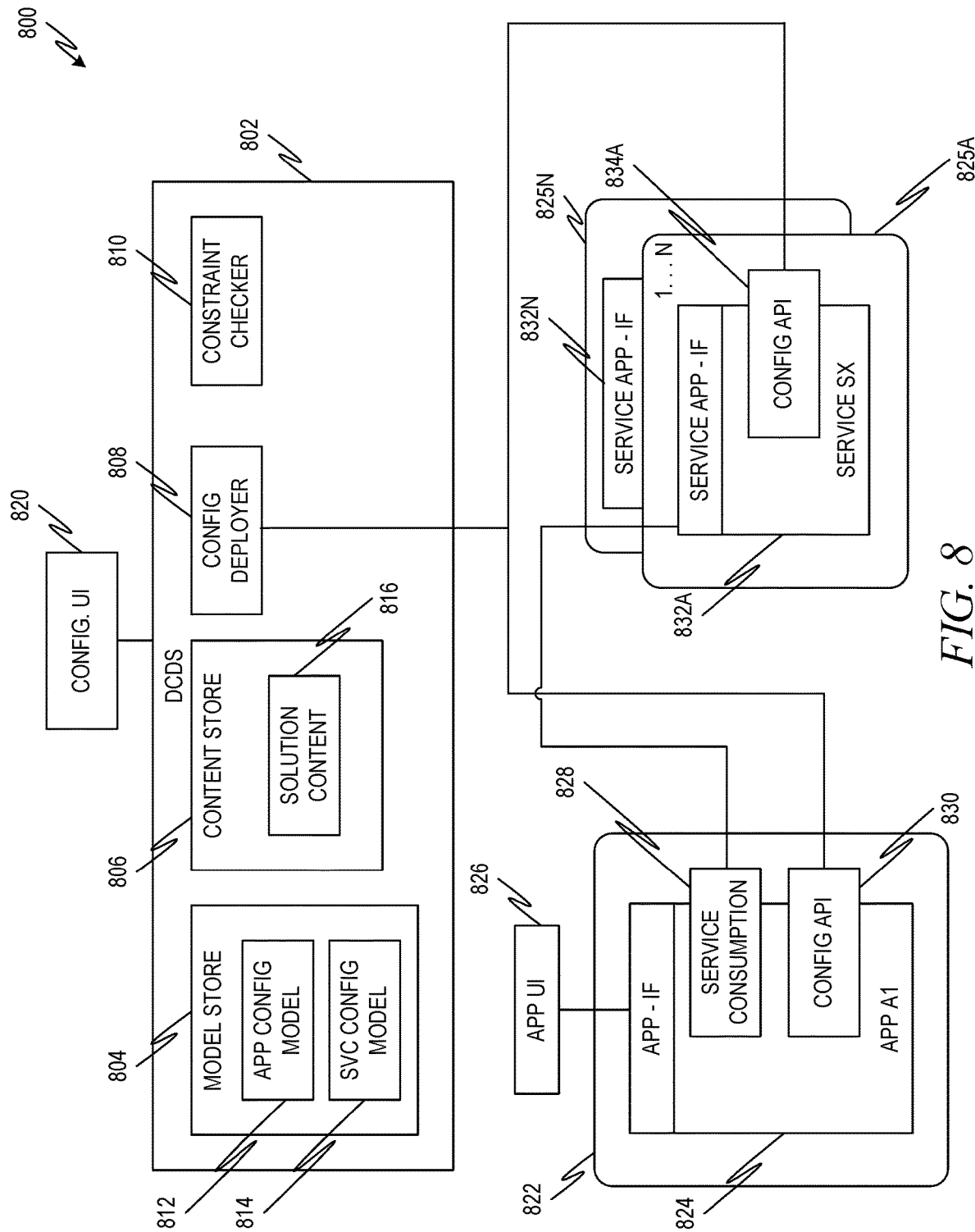
FIG. 8 is a diagram showing another example environment for configuring an application that uses microservices.

FIG. 8 is a diagram showing another example environment 800 for configuring an application 824 that uses microservices. The environment 800 includes a DCDS 802 that may operate in a manner similar to that of the other DCDSs described herein. The DCDS 802 includes (or is in communication with) a model store 804. The model store 804 includes one or more application configuration models 812 for the application 824. The model store 804 may also include one or more service configuration models 814. The DCDS 802 may also include a content store 806. The content store 806 may be a data structure that includes solution content 816. In some examples, solution content 816 includes more than one example of solution content. For example, one example of solution content may include content for a first scenario for executing the application 824 while another example of solution content may include content for a second scenario for executing the application 824.

Application configuration parameter values are received via a configuration UI 820, for example, as described herein. A constraint checker 810 checks the application configuration parameter values, for example, against microservice configuration constraints and/or application configuration constraints.

In the example of FIG. 8, instead of having a single configuration API, such as the configuration API 106 of FIG. 1, the DCDS 802 includes a configuration deployer 808 that operates in conjunction with a configuration API 830 at the application 824 and/or with configuration APIs, such as configuration API 834A, at the various microservices 832A, 832N. For example, the functionality of the process flows 400 and 500 may be performed by the configuration deployer 808 in conjunction with the configuration APIs 830, 834A.

In the example of FIG. 8, the application 824 is executed at an application computing device 822, which may be any suitable computing device or combination of networked computing devices. The application 824 is in communication with an application UI 826 for interfacing with a user. In addition to the configuration API 830, the application 824 may also comprise a service consumption module 828 that coordinates communication with one or more microservices 832A, 832N. The microservices 832A, 832N are executed at one or more computing devices 825A, 825N. Although only one configuration API 834A is shown, other microservices, such as microservice 832N may also include configuration APIs.

Figure 9:
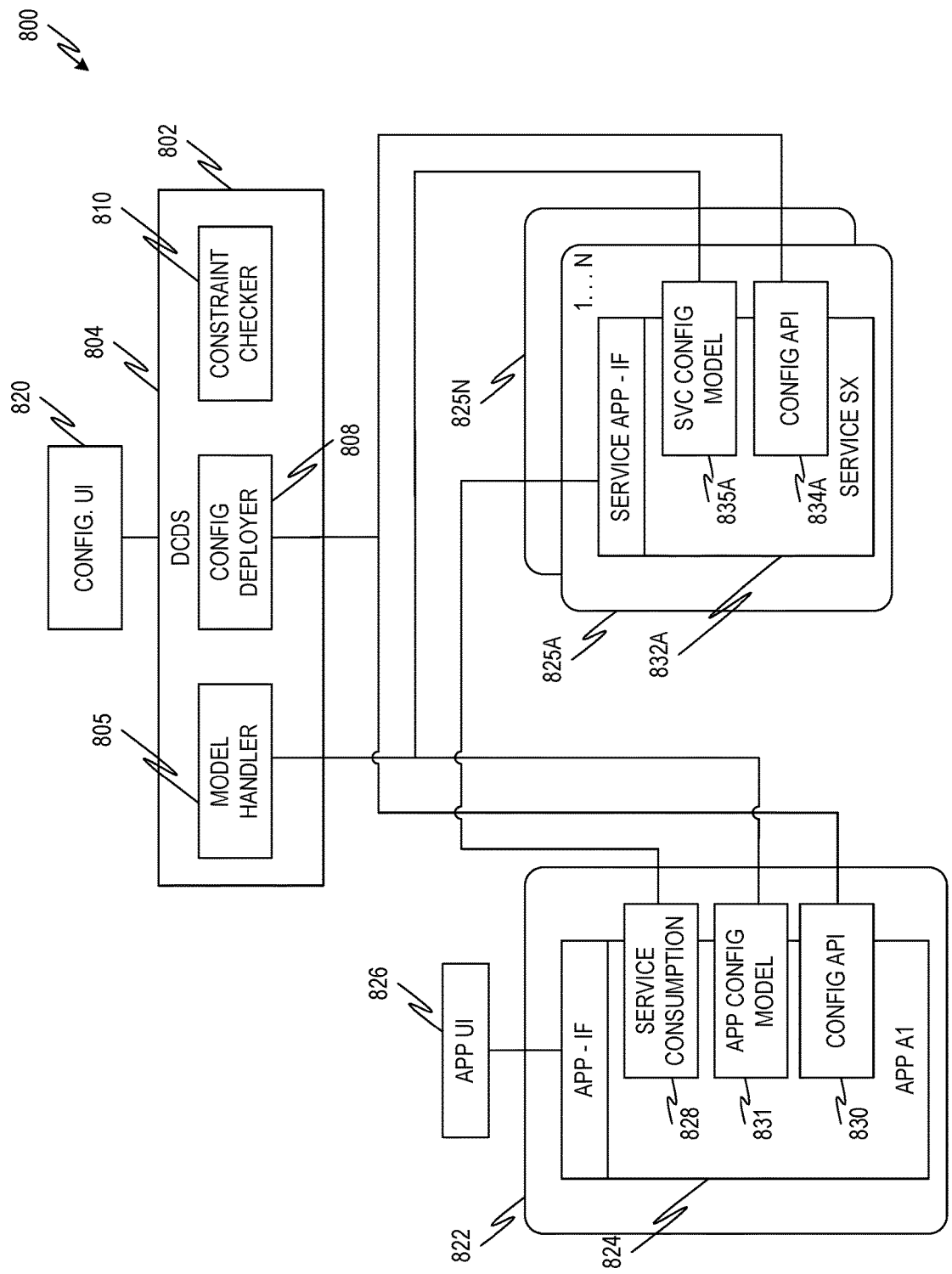
FIG. 9 is a diagram showing another configuration of the example environment of FIG. 8.

FIG. 9 is a diagram showing another configuration of the example environment 800 for configuring an application 824 that uses microservices. In FIG. 9, configuration models for the application (application configuration model 831) and for the microservices (service configuration model 835A)

are stored at the application 824 and microservices, such as 832A, respectively. A model handler 805 at the DCDS 802 accesses configuration models 831, 835A, as described herein.

Figure 10:
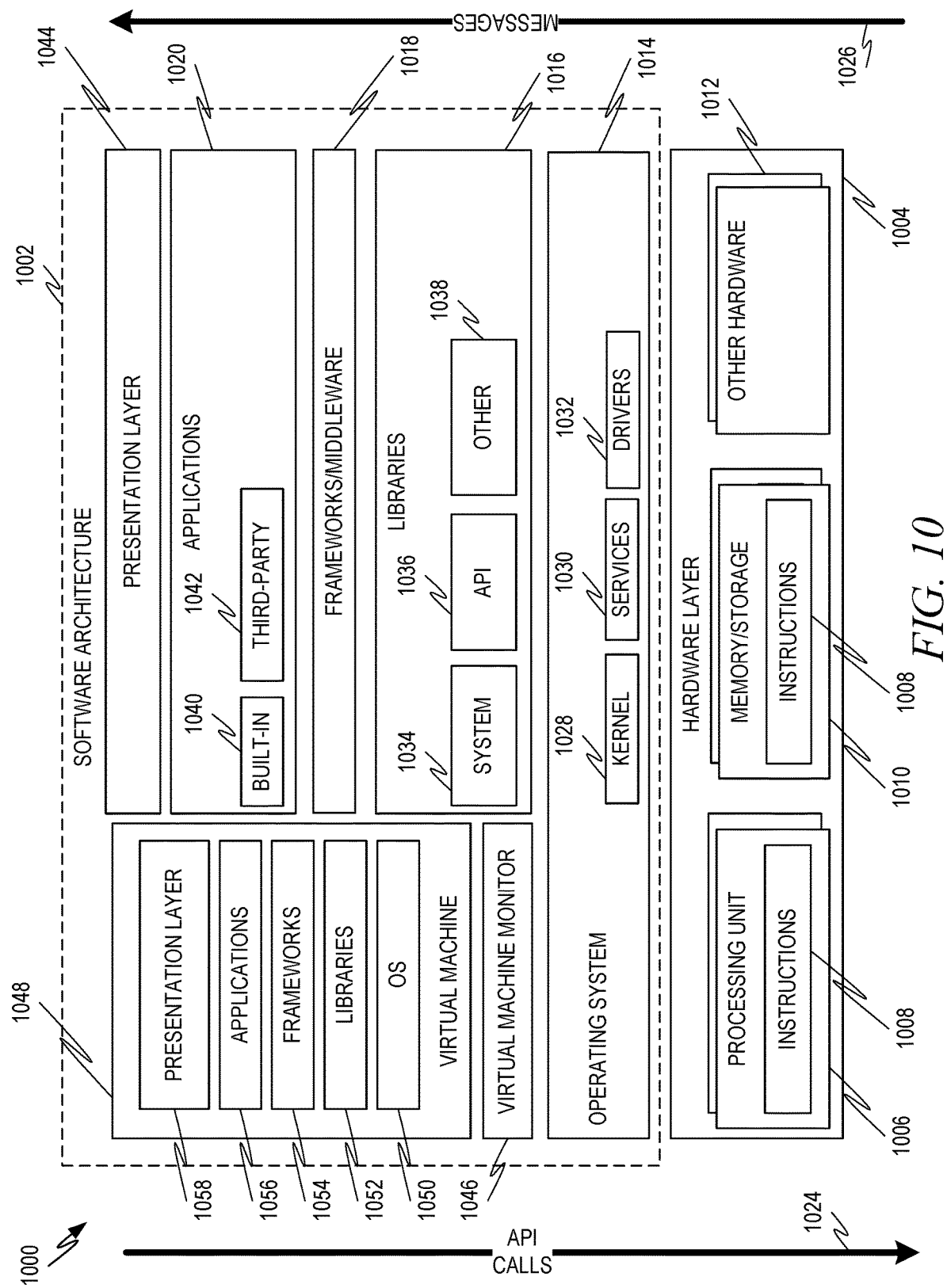
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system 1100 of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of computer system 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke API calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules. In some examples, libraries 1038 may provide one or more APIs serviced by a message oriented middleware.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 includes built-in applications 1040 and/or third party applications 1042. Examples of representative built-in applications 1040 may include, but are not limited to, a contacts application, a browser application, a book reader application, a location application, a media application, a messaging application, and/or a game application. Third party applications 1042 may include any of the built in applications as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system 1034, APIs 1036, and other libraries 1038), frameworks/middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

EXAMPLES

Example 1 is a system for configuring an application that uses a plurality of microservices, the system comprising: at least one processor unit; and a machine-readable medium in communication with the at least one processor, the machine-readable medium comprising instructions stored thereon that are executable by the at least one processor unit to cause the system to perform operations comprising: generating, by a distributed configuration deploy service executed at the at least one processor unit, a first set of microservice configuration parameter values for a first microservice of the plurality of microservices based at least in part on a first microservice configuration model for the first microservice and at least in part on a second configuration model for a second microservice of the plurality of microservices; determining, by a configuration application programming interface (API) executed at the at least one processor unit, that the first set of microservice configuration parameter values do not conflict with first live data at the first microservice; locking, by the configuration API, the first microservice; applying, by the configuration API, the first set of microservice configuration parameter values, to the first microservice; and releasing, by the configuration API, the locking of the first microservice.

In Example 2, the subject matter of Example 1 optionally includes wherein the machine-readable medium further comprises instructions stored thereon that are executable by the at least one processor unit to cause the system to perform operations comprising: sending, by the distributed configuration deploy service and to a configuration API, a check request comprising a second set of microservice configuration parameter values for the second microservice; and receiving, by the distributed configuration deploy service and from the configuration API, an indication that the second set of microservice configuration parameter values do not conflict with second live data at the second microservice.

In Example 3, the subject matter of any one or more of Examples 1-2 optionally includes wherein the machine-readable medium further comprises instructions stored thereon that are executable by the at least one processor unit to cause the system to perform operations comprising: generating, by the distributed configuration deploy service, a second set of microservice configuration parameter values for the second microservice based at least in part on the first microservice configuration model and the second microservice configuration model; before applying the first set of microservice configuration parameter values to the first microservice, determining, by the configuration API, that the second set of microservice configuration parameter values do not conflict with second live data at the second microservice; locking, by the configuration API, the second microservice; applying, by the configuration API, the second set of microservice configuration parameter values at the second microservice; and releasing, by the configuration API, the locking of the second microservice.

In Example 4, the subject matter of any one or more of Examples 1-3 optionally includes wherein the machine-readable medium further comprises instructions stored thereon that are executable by the at least one processor unit to cause the system to perform operations comprising: accessing, by the distributed configuration deploy service, a first microservice configuration model for the first microservice; accessing, by the distributed configuration deploy service, a second microservice configuration model for the second microservice; generating, by the distributed configuration deploy service, a configuration user interface (UI) based at least in part on the first microservice configuration model and the second microservice configuration model; and receiving, by the distributed configuration deploy service, through the configuration UI, a plurality of configuration parameter values, wherein the generating of the first set of configuration parameter values is also based at least in part on at least a portion of the plurality of configuration parameter values.

In Example 5, the subject matter of Example 4 optionally include wherein the machine-readable medium further comprises instructions stored thereon that are executable by the at least one processor unit to cause the system to perform operations comprising accessing, by the distributed configuration deploy service, an application configuration model comprising an indication of the first microservice configuration model and an indication of the second microservice configuration model.

In Example 6, the subject matter of any one or more of Examples 1-5 optionally includes wherein the generating of the first set of microservice configuration parameter values is also based at least in part on an application configuration model, wherein the application configuration model comprises an indication of the plurality of microservices.

In Example 7, the subject matter of any one or more of Examples 1-6 optionally includes wherein the machine-readable medium further comprises instructions stored thereon that are executable by the at least one processor unit to cause the system to perform operations comprising: generating, by the distributed configuration deploy service, a configuration user interface (UI), the configuration UI comprising: a first field to receive a first configuration parameter value for the first microservice; a second field to receive a second configuration parameter value for the second microservice; and a third field to receive a shared configuration parameter value common to the first microservice and the second microservice, wherein the first set of microservice configuration parameter values is based at least in part on the first configuration parameter value and the shared configuration parameter value.

In Example 8, the subject matter of Example 7 optionally include wherein the machine-readable medium further comprises instructions stored thereon that are executable by the at least one processor unit to cause the system to perform operations comprising determining, by the distributed configuration deploy service, that the first configuration parameter value does not conflict with the second configuration parameter value.

Example 9 is a method for configuring an application that uses a plurality of microservices, the method comprising: generating, by a distributed configuration deploy service executed at a computing system, a first set of microservice configuration parameter values for a first microservice of the plurality of microservices based at least in part on a first microservice configuration model for the first microservice and at least in part on a second configuration model for a second microservice of the plurality of microservices; determining, by a configuration application programming interface (API) executed at the computing system, that the first set of microservice configuration parameter values do not conflict with first live data at the first microservice; locking, by the configuration API, the first microservice; applying, by the configuration API, the first set of microservice configuration parameter values, to the first microservice; and releasing, by the configuration API, the locking of the first microservice.

In Example 10, the subject matter of Example 9 optionally include sending, by the distributed configuration deploy service and to a configuration API, a check request comprising a second set of microservice configuration parameter values for the second microservice; and receiving, by the distributed configuration deploy service and from the configuration API, an indication that the second set of microservice configuration parameter values do not conflict with second live data at the second microservice.

In Example 11, the subject matter of any one or more of Examples 9-10 optionally includes generating, by the distributed configuration deploy service, a second set of microservice configuration parameter values for the second microservice based at least in part on the first microservice configuration model and the second microservice configuration model; before applying the first set of microservice configuration parameter values to the first microservice, determining, by the configuration API, that the second set of microservice configuration parameter values do not conflict with second live data at the second microservice; locking, by the configuration API, the second microservice; applying, by the configuration API, the second set of microservice configuration parameter values at the second microservice; and releasing, by the configuration API, the locking of the second microservice.

In Example 12, the subject matter of any one or more of Examples 9-11 optionally includes accessing, by the distributed configuration deploy service, a first microservice configuration model for the first microservice; accessing, by the distributed configuration deploy service, a second microservice configuration model for the second microservice; generating, by the distributed configuration deploy service, a configuration user interface (UI) based at least in part on the first microservice configuration model and the second microservice configuration model; and receiving, by the distributed configuration deploy service, through the configuration UI, a plurality of configuration parameter values, wherein the generating of the first set of configuration parameter values is also based at least in part on at least a portion of the plurality of configuration parameter values.

In Example 13, the subject matter of Example 12 optionally include accessing, by the distributed configuration deploy service, an application configuration model comprising an indication of the first microservice configuration model and an indication of the second microservice configuration model.

In Example 14, the subject matter of any one or more of Examples 9-13 optionally includes wherein the generating of the first set of microservice configuration parameter values is also based at least in part on an application configuration model, wherein the application configuration model comprises an indication of the plurality of microservices.

In Example 15, the subject matter of any one or more of Examples 9-14 optionally includes generating, by the distributed configuration deploy service, a configuration user interface (UI), the configuration UI comprising: a first field to receive a first configuration parameter value for the first microservice; a second field to receive a second configuration parameter value for the second microservice; and a third field to receive a shared configuration parameter value common to the first microservice and the second microservice, wherein the first set of microservice configuration parameter values is based at least in part on the first configuration parameter value and the shared configuration parameter value.

In Example 16, the subject matter of Example 15 optionally includes determining, by the distributed configuration deploy service, that the first configuration parameter value does not conflict with the second configuration parameter value.

Example 17 is a machine-readable medium comprising instructions thereon that, when executed by at least one processor unit, causes the at least one processor unit to execute operations comprising: generating, by a distributed configuration deploy service, a first set of microservice configuration parameter values for a first microservice of a plurality of microservices for an application based at least in part on a first microservice configuration model for the first microservice and at least in part on a second configuration model for a second microservice of the plurality of microservices; determining, by a configuration application programming interface (API), that the first set of microservice configuration parameter values do not conflict with first live data at the first microservice; locking, by the configuration API, the first microservice; applying, by the configuration API, the first set of microservice configuration parameter values, to the first microservice; and releasing, by the configuration API, the locking of the first microservice.

In Example 18, the subject matter of Example 17 optionally includes instructions thereon that, when executed by the at least one processor unit, causes the at least one processor unit to perform operations comprising: sending, by the distributed configuration deploy service and to a configuration API, a check request comprising a second set of microservice configuration parameter values for the second microservice; and receiving, by the distributed configuration deploy service and from the configuration API, an indication that the second set of microservice configuration parameter values do not conflict with second live data at the second microservice.

In Example 19, the subject matter of any one or more of Examples 17-18 optionally includes instructions thereon that, when executed by the at least one processor unit, causes the at least one processor unit to perform operations comprising: generating, by the distributed configuration deploy service, a second set of microservice configuration parameter values for the second microservice based at least in part on the first microservice configuration model and the second microservice configuration model; before applying the first set of microservice configuration parameter values to the first microservice, determining, by the configuration API, that the second set of microservice configuration parameter values do not conflict with second live data at the second microservice; locking, by the configuration API, the second microservice; applying, by the configuration API, the second set of microservice configuration parameter values at the second microservice; and releasing, by the configuration API, the locking of the second microservice.

In Example 20, the subject matter of any one or more of Examples 17-19 optionally includes instructions thereon that, when executed by the at least one processor unit, causes the at least one processor unit to perform operations comprising: accessing, by the distributed configuration deploy service, a first microservice configuration model for the first microservice; accessing, by the distributed configuration deploy service, a second microservice configuration model for the second microservice; generating, by the distributed configuration deploy service, a configuration user interface (UI) based at least in part on the first microservice configuration model and the second microservice configuration model; and receiving, by the distributed configuration deploy service, through the configuration UI a plurality of configuration parameter values, wherein the generating of the first set of configuration parameter values is also based at least in part on at least a portion of the plurality of configuration parameter values.

Example Machine Architecture and Machine-Readable Medium

Figure 11:
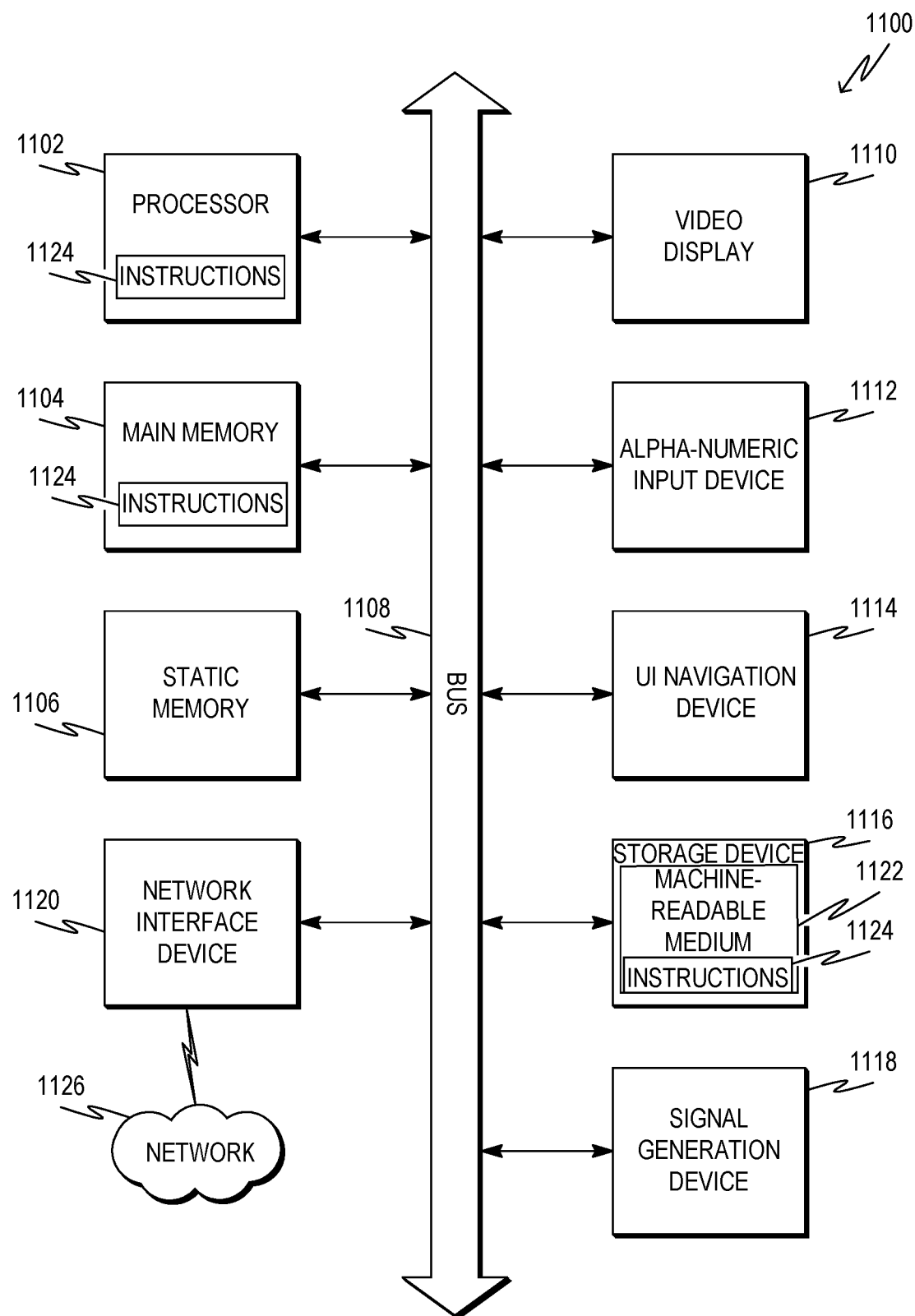
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a UI navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for configuring an application that uses a plurality of microservices, the system comprising:
   at least one processor unit; and
   a machine-readable medium in communication with the at least one processor, the machine-readable medium comprising instructions stored thereon that are executable by the at least one processor unit to cause the system to perform operations comprising:
      generating, by a distributed configuration deploy service executed at the at least one processor unit; a first set of microservice configuration parameter values for a first microservice of the plurality of microservices based at least in part on a first microservice configuration model for the first microservice and at least in part on a second configuration model for a second microservice of the plurality of microservices;
      determining, by a configuration application programming interface (API) executed at the at least one processor unit, that the first set of microservice configuration parameter values do not conflict with first live data at the first microservice;
      locking, by the configuration API, the first microservice;
      applying, by the configuration API, the first set of microservice configuration parameter values, to the first microservice; and
      releasing, by the configuration API, the locking of the first microservice.

2. The system of claim 1, wherein the machine-readable medium further comprises instructions stored thereon that are executable by the at least one processor unit to cause the system to perform operations comprising:
   sending, by the distributed configuration deploy service and to a configuration API, a check request comprising a second set of microservice configuration parameter values for the second microservice; and
   receiving, by the distributed configuration deploy service and from the configuration API, an indication that the second set of microservice configuration parameter values do not conflict with second live data at the second microservice.

3. The system of claim 1, wherein the machine-readable medium further comprises instructions stored thereon that are executable by the at least one processor unit to cause the system to perform operations comprising:
   generating, by the distributed configuration deploy service, a second set of microservice configuration parameter values for the second microservice based at least in part on the first microservice configuration model and the second microservice configuration model;
   before applying the first set of microservice configuration parameter values to the first microservice, determining, by the configuration API, that the second set of microservice configuration parameter values do not conflict with second live data at the second microservice;
   locking, by the configuration API, the second microservice;
   applying, by the configuration API, the second set of microservice configuration parameter values at the second microservice; and
   releasing; by the configuration API, the locking of the second microservice.

4. The system of claim 1, wherein the machine-readable medium further comprises instructions stored thereon that are executable by the at least one processor unit to cause the system to perform operations comprising:
   accessing, by the distributed configuration deploy service, a first microservice configuration model for the first microservice:
   accessing, by the distributed configuration deploy service, a second microservice configuration model for the second microservice;
   generating, by the distributed configuration deploy service, a configuration user interface (UI) based at least in part on the first microservice configuration model and the second microservice configuration model; and
   receiving, by the distributed configuration deploy service, through the configuration UI, a plurality of configuration parameter values, wherein the generating of the first set of configuration parameter values is also based at least in part on at least a portion of the plurality of configuration parameter values.

5. The system of claim 4, wherein the machine-readable medium further comprises instructions stored thereon that are executable by the at least one processor unit to cause the system to perform operations comprising accessing, by the distributed configuration deploy service, an application configuration model comprising an indication of the first microservice configuration model and an indication of the second microservice configuration model.

6. The system of claim 1, wherein the generating of the first set of microservice configuration parameter values is also based at least in part on an application configuration model, wherein the application configuration model comprises an indication of the plurality of microservices.

7. The system of claim 1, wherein the machine-readable medium further comprises instructions stored thereon that are executable by the at least one processor unit to cause the system to perform operations comprising:
   generating, by the distributed configuration deploy service, a configuration user interface (UI), the configuration comprising:
   a first field to receive a first configuration parameter value for the first microservice;
   a second field to receive a second configuration parameter value for the second microservice; and
   a third field to receive a shared configuration parameter value common to the first microservice and the second microservice, wherein the first set of microservice configuration parameter values is based at least in part on the first configuration parameter value and the shared configuration parameter value.

8. The system of claim 7, wherein the machine-readable medium further comprises instructions stored thereon that are executable by the at least one processor unit to cause the system to perform operations comprising determining, by the distributed configuration deploy service, that the first configuration parameter value does not conflict with the second configuration parameter value.

9. A method for configuring an application that uses a plurality of microservices, the method comprising:
generating, by a distributed configuration deploy service executed at a computing system, a first set of microservice configuration parameter values for a first microservice of the plurality of microservices based at least in part on a first microservice configuration model for the first microservice and at least in part on a second configuration model for a second microservice of the plurality of microservices;
determining, by a configuration application programming interface (API) executed at the computing system, that the first set of microservice configuration parameter values do not conflict with first live data at the first microservice;
locking, by the configuration API, the first microservice;
applying, by the configuration API, the first set of microservice configuration parameter values, to the first microservice; and
releasing, by the configuration API, the locking of the first microservice.

10. The method of claim 9, further comprising:
sending, by the distributed configuration deploy service and to a configuration API, a check request comprising a second set of microservice configuration parameter values for the second microservice; and
receiving, by the distributed configuration deploy service and from the configuration API, an indication that the second set of microservice configuration parameter values do not conflict with second live data at the second microservice.

11. The method of claim 9, further comprising:
generating, by the distributed configuration deploy service, a second set of microservice configuration parameter values for the second microservice based at least in part on the first microservice configuration model and the second microservice configuration model;
before applying the first set of microservice configuration parameter values to the first microservice, determining, by the configuration API, that the second set of microservice configuration parameter values do not conflict with second live data at the second microservice;
locking, by the configuration API, the second microservice;
applying, by the configuration API, the second set of microservice configuration parameter values at the second microservice; and
releasing, by the configuration API, the locking of the second microservice.

12. The method of claim 9, further comprising:
accessing, by the distributed configuration deploy service, a first microservice configuration model for the first microservice;
accessing, by the distributed configuration deploy service, a second microservice configuration model for the second microservice;
generating, by the distributed configuration deploy service, a configuration user interface (UI) based at least in part on the first microservice configuration model and the second microservice configuration model; and
receiving, by the distributed configuration deploy service, through the configuration UI, a plurality of configuration parameter values, wherein the generating of the first set of configuration parameter values is also based at least in part on at least a portion of the plurality of configuration parameter values.

13. The method of claim 12, further comprising:
accessing, by the distributed configuration deploy service, an application configuration model comprising an indication of the first microservice configuration model and an indication of the second microservice configuration model.

14. The method of claim 9, wherein the generating of the first set of microservice configuration parameter values is also based at least in part on an application configuration model, wherein the application configuration model comprises an indication of the plurality of microservices.

15. The method of claim 9, further comprising:
generating, by the distributed configuration deploy service, a configuration user interface (UI), the configuration UI comprising:
a first field to receive a first configuration parameter value for the first microservice;
a second field to receive a second configuration parameter value for the second microservice; and
a third field to receive a shared configuration parameter value common to the first microservice and the second microservice, wherein the first set of microservice configuration parameter values is based at least in part on the first configuration parameter value and the shared configuration parameter value.

16. The method of claim 15, further comprising determining, by the distributed configuration deploy service, that the first configuration parameter value does not conflict with the second configuration parameter value.

17. A non-transitory machine-readable medium comprising instructions thereon that, when executed by at least one processor unit, causes the at least one processor unit to execute operations comprising:
generating, by a distributed configuration deploy service, a first set of microservice configuration parameter values for a first microservice of a plurality of microservices for an application based at least in part on a first microservice configuration model for the first microservice and at least in part on a second configuration model for a second microservice of the plurality of microservices;
determining, by a configuration application programming interface (API), that the first set of microservice configuration parameter values do not conflict with first live data at the first microservice;
locking, by the configuration API, the first microservice;
applying, by the configuration API; the first set of microservice configuration parameter values, to the first microservice; and
releasing; by the configuration API, the locking of the first microservice.

18. The medium of claim 17, further comprising instructions thereon that; when executed by the at least one processor unit, causes the at least one processor unit to perform operations comprising:
sending, by the distributed configuration deploy service and to a configuration API, a check request comprising a second set of microservice configuration parameter values for the second microservice; and
receiving, by the distributed configuration deploy service and from the configuration API, an indication that the second set of microservice configuration parameter values do not conflict with second live data at the second microservice.

19. The medium of claim 17, further comprising instructions thereon that, when executed by the at least one processor unit, causes the at least one processor unit to perform operations comprising:
- generating, by the distributed configuration deploy service, a second set of microservice configuration parameter values for the second microservice based at least in part on the first microservice configuration model and the second microservice configuration model;
- before applying the first set of microservice configuration parameter values to the first microservice, determining, by the configuration API, that the second set of microservice configuration parameter values do not conflict with second live data at the second microservice;
- locking, by the configuration API, the second microservice;
- applying, by the configuration API, the second set of microservice configuration parameter values at the second microservice; and
- releasing, by the configuration API, the locking of the second microservice.

20. The medium of claim 17, further comprising instructions thereon that, when executed by the at least one processor unit; causes the at least one processor unit to perform operations comprising:
- accessing, by the distributed configuration deploy service, a first microservice configuration model for the first microservice;
- accessing, by the distributed configuration deploy service, a second microservice configuration model for the second microservice;
- generating, by the distributed configuration deploy service, a configuration user interface (UI) based at least in part on the first microservice configuration model and the second microservice configuration model; and
- receiving, by the distributed configuration deploy service, through the configuration UI a plurality of configuration parameter values, wherein the generating of the first set of configuration parameter values is also based at least in part on at least a portion of the plurality of configuration parameter values.

* * * * *